(12) United States Patent
Knox et al.

(10) Patent No.: US 12,600,289 B2
(45) Date of Patent: Apr. 14, 2026

(54) RESTRAINT SYSTEM FOR CARTS AND OTHER CARGO

(71) Applicant: Ancra International LLC, Azusa, CA (US)

(72) Inventors: Howard Thomas Knox, Cold Spring, KY (US); Gregory Kauffman, Cincinnati, OH (US); Jerome Jones, Independence, KY (US)

(73) Assignee: Ancra International LLC, Azusa, CA (US)

( * ) Notice: Subject to any disclaimer, the term of this patent is extended or adjusted under 35 U.S.C. 154(b) by 1023 days.

(21) Appl. No.: 17/730,901

(22) Filed: Apr. 27, 2022

(65) Prior Publication Data

US 2022/0250533 A1 Aug. 11, 2022

Related U.S. Application Data

(62) Division of application No. 17/338,920, filed on Jun. 4, 2021, now Pat. No. 11,345,273.

(60) Provisional application No. 63/036,158, filed on Jun. 8, 2020.

(51) Int. Cl.
*B60P 7/15* (2006.01)

(52) U.S. Cl.
CPC ..................................... *B60P 7/15* (2013.01)

(58) Field of Classification Search
CPC ........................................................ B60P 7/15
USPC ............................................ 410/89, 143–150
See application file for complete search history.

(56) References Cited

U.S. PATENT DOCUMENTS

| | | | |
|---|---|---|---|
| 1,735,800 A | 11/1929 | Snyder | |
| 2,467,681 A | 4/1949 | McKinney | |
| 5,104,269 A | 4/1992 | Hardison | |
| 5,941,667 A | 8/1999 | Hardison | |
| 6,074,143 A * | 6/2000 | Langston | .................. B60P 7/15 |
| | | | 410/148 |
| 7,731,462 B2 | 6/2010 | Squyres | |
| 11,345,273 B2 * | 5/2022 | Knox | ......................... B60P 7/15 |
| 2013/0223949 A1 * | 8/2013 | Garrigus | .................. B60P 7/15 |
| | | | 410/143 |

(Continued)

OTHER PUBLICATIONS

International Search Report and Written Opinion for PCT Application No. PCT/US2021/035850 mailed Nov. 15, 2021, 16 pgs.

(Continued)

*Primary Examiner* — Stephen T Gordon
(74) *Attorney, Agent, or Firm* — SHOOK, HARDY & BACON L.L.P.

(57) ABSTRACT

Systems and methods are provided for restraining cargo in a cargo compartment. In one embodiment, the system comprises a first track sub-assembly comprising a vertical track secured to at least one horizontal support member. The at least one horizontal support member is dimensioned to span between a plurality of preexisting vertical logistics posts on a first sidewall of a cargo compartment. In one embodiment, the at least one horizontal support member comprises first and second ends, and a center point positioned halfway between the first and second ends, wherein a central longitudinal axis of the vertical track is offset from the center point of the first horizontal support member by a predetermined distance. A first beam assembly having a first end assembly is movable along the vertical track and configured to be secured at a predetermined height.

12 Claims, 12 Drawing Sheets

(56) References Cited

U.S. PATENT DOCUMENTS

2018/0022263  A1      1/2018   Meyers
2019/0234442  A1 *    8/2019   Shangle .................... B60P 1/02

OTHER PUBLICATIONS

Invitation to pay additional fees, and where applicable, protest fee for International Application No. PCT/US2021/035850 mailed Sep. 23, 2021, 10 pgs.

International Preliminary Report on Patentability received for PCT Application No. PCT/US2021/035850, mailed on Dec. 22, 2022, 11 pages.

* cited by examiner

FIG. 11C                 FIG. 11D
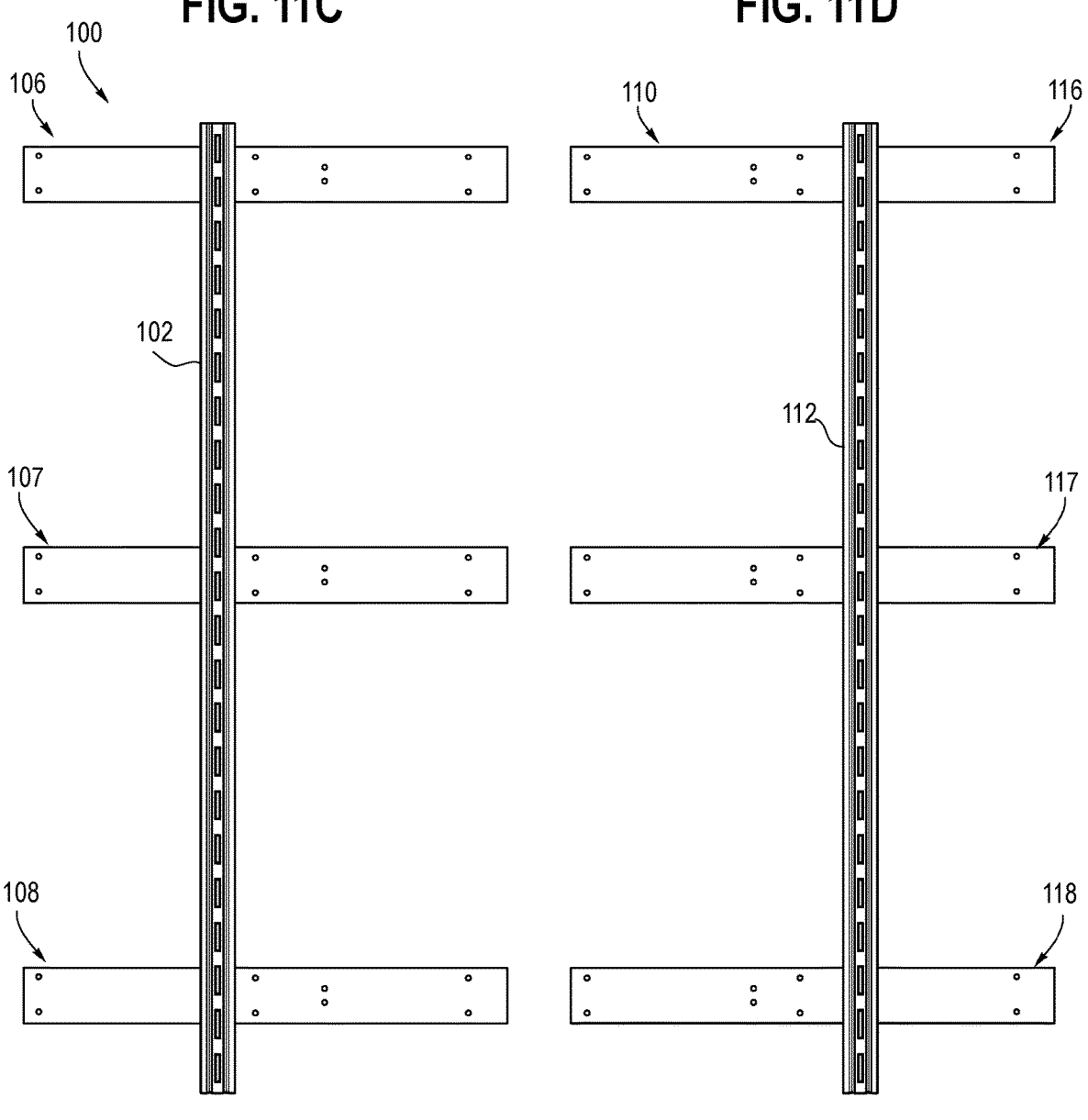

RESTRAINT SYSTEM FOR CARTS AND OTHER CARGO

PRIORITY CLAIM

The present patent document is a divisional application that claims the benefit of priority under 35 U.S.C. § 121 of U.S. patent application Ser. No. 17/338,920, filed Jun. 4, 2021, which claims the benefit of priority of U.S. Provisional Application Ser. No. 63/036,158, filed Jun. 8, 2020, each of which is hereby incorporated by reference in its entirety.

BACKGROUND

The present embodiments relate generally to systems and methods for restraining cargo, such as carts, when disposed in a movable cargo compartment.

Certain movable cargo compartments employ the use of beams or straps to restrain cargo to being transported within the cargo compartment. In some systems, stand-alone beams are brought in from outside of the cargo compartment, and in each usage are engaged and disengaged from coupling locations in the cargo compartment. In such situations, the stand-alone beams are required to be stored at a loading dock, and may need to be moved on and off the cargo compartment each time it is loaded or unloaded. This process takes added time and may increase the likelihood of injuries.

In some other systems, cargo securement straps may be used to secure cargo. However, in a situation where the cargo comprises a plurality of carts, a significant number of straps would be required to adequately restrain the carts individually. Further, the straps would take a relatively long time to install, and subsequently need to be rolled into a storage state.

Moreover, in prior systems, when the beam comprises a relatively large width, and multiple beams are provided in a forward to rearward direction in the cargo compartment, the larger width beams may take up increased space in the cargo compartment. For example, when the cargo comprises a plurality of carts, fewer carts may be able to be loaded within the cargo compartment if the beam restraining the carts has a relatively large width.

SUMMARY

Systems and methods are provided for restraining cargo in a cargo compartment. In one embodiment, the system comprises a first track sub-assembly comprising a vertical track secured to at least one horizontal support member. The at least one horizontal support member is dimensioned to span between a plurality of preexisting vertical logistics posts on a first sidewall of a cargo compartment. In one embodiment, the at least one horizontal support member comprises first and second ends, and a center point positioned halfway between the first and second ends, wherein a central longitudinal axis of the vertical track is offset from the center point of the first horizontal support member by a predetermined distance. A first beam assembly having a first end assembly is movable along the vertical track and configured to be secured at a predetermined height.

In one embodiment, a beam assembly for restraining cargo in a cargo compartment comprises a beam member having first and second ends, and a hollow interior space. A first end assembly extends laterally outward from the first end of the beam member. The first end assembly comprises an inner segment, a bracket assembly, and a latch assembly for engaging a track in a cargo compartment. The inner segment comprises a main body dimensioned to be slidably received within the hollow interior space of the beam member. The bracket assembly comprises a first bracket having a main body that extends in a substantially parallel direction to the main body of the inner segment, and comprises at least one curved segment facing inward towards the inner segment of the beam assembly to reduce pinch points associated with the inner segment of the beam assembly.

The beam member may comprise an upper surface, a lower surface, and first and second side surfaces, which collectively bound the hollow interior space. In one example, a ratio of a height of the beam member to a width of the beam member is in a range of between about 1.3 to about 4.0.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 11A-11D are side views of various track sub-assemblies in accordance with the present embodiments.

DETAILED DESCRIPTION OF THE PREFERRED EMBODIMENTS

Figure 1:
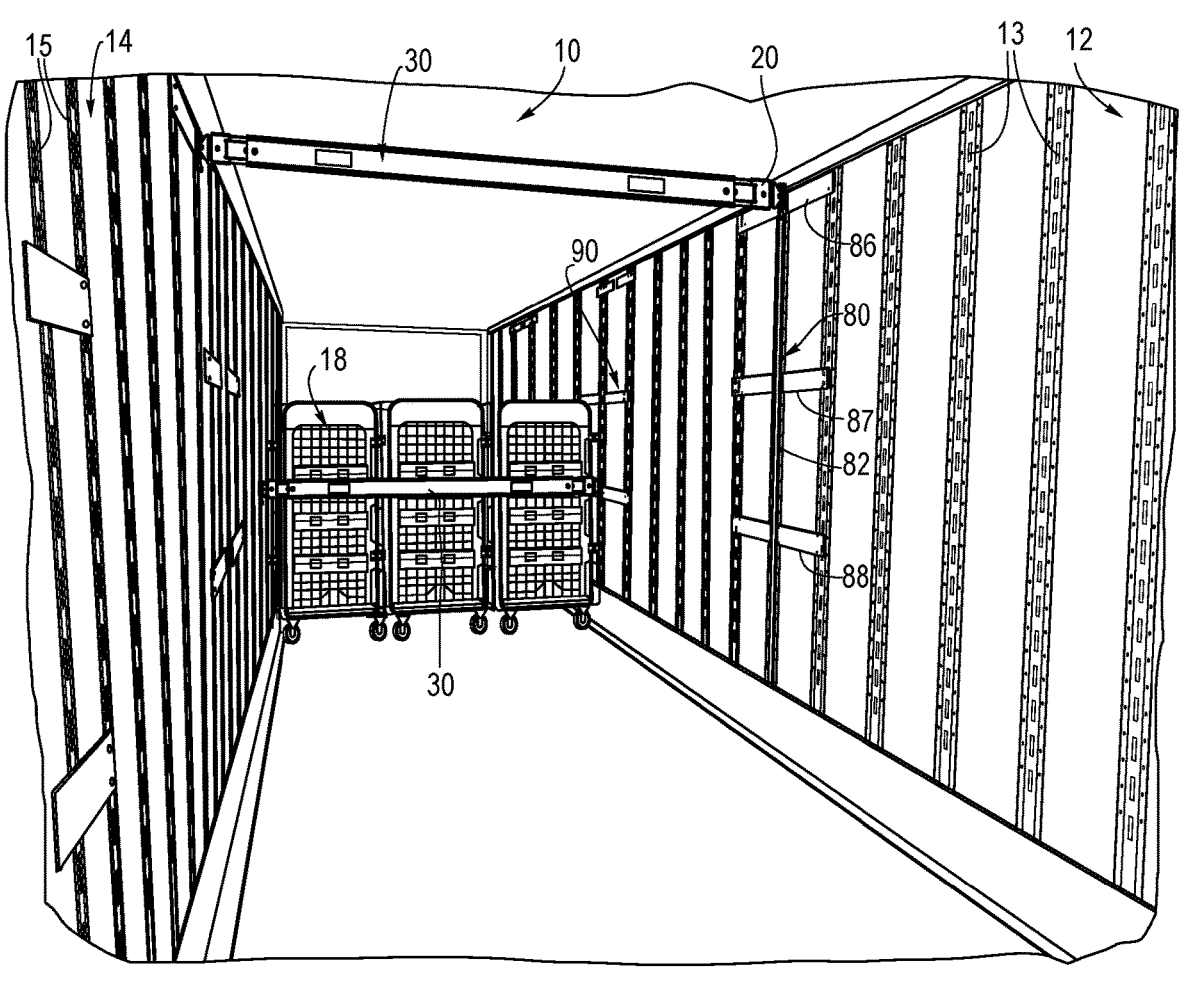
FIG. 1 is a perspective view of an exemplary cargo compartment, including features of a system for restraining cargo in accordance with the present embodiments, taken in a rearward to forward direction.
Figure 2:
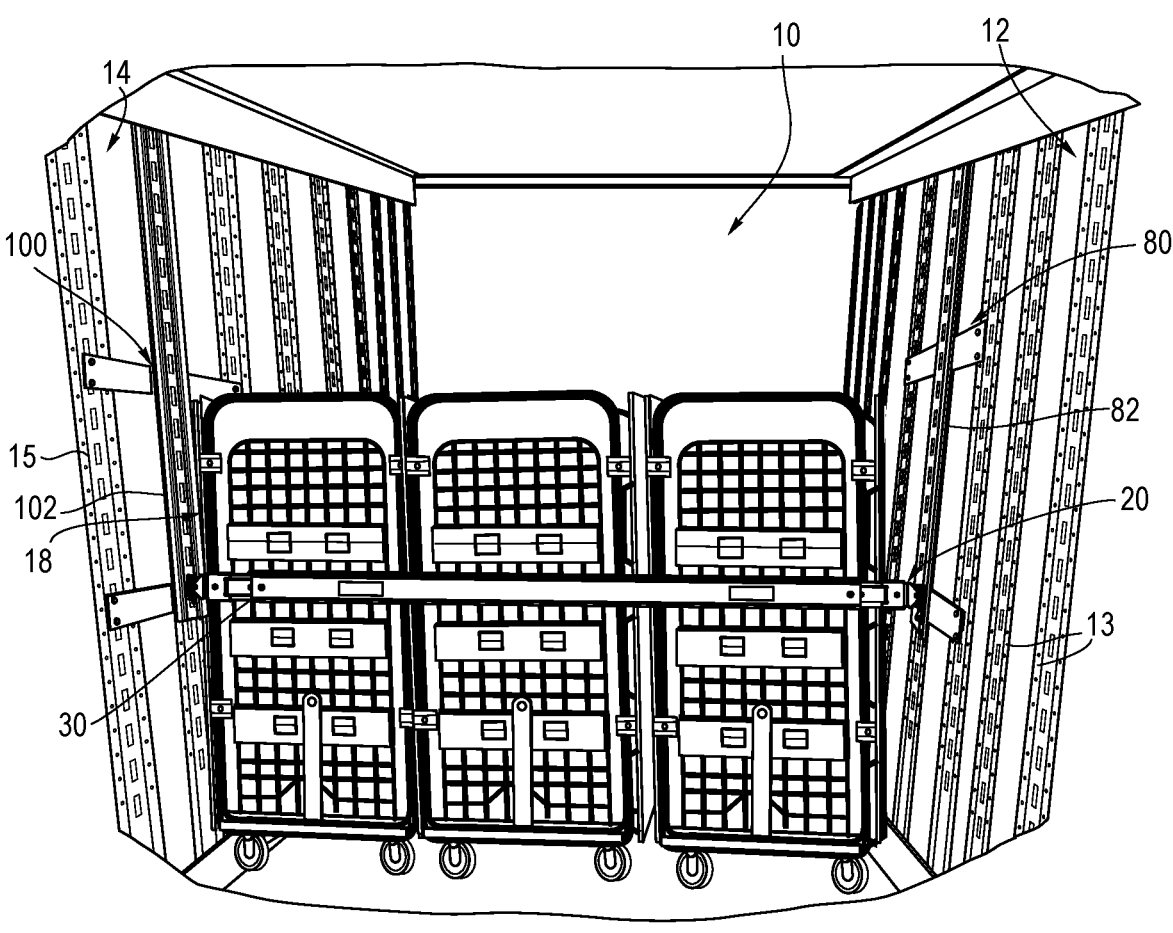
FIG. 2 is an enlarged perspective view of the cargo compartment of FIG. 1.

Referring to FIGS. 1-12, a system 20 for restraining cargo 18 within a cargo compartment 10 is provided. As depicted in FIGS. 1-2, the cargo compartment 10 may be for a truck, an intermodal container, a rail car, a compartment on a boat or aircraft or the like. While any of these types of cargo compartments can successfully receive the system 20, the system 20 will be described and depicted in detail as installed and used within the cargo compartment of a truck. One of ordinary skill in the art with a thorough review of this specification and figures will readily understand that the system 20 can be adapted for other types of cargo compartments and would be able to implement the system 20 in other types of cargo compartments.

Moreover, while many types of cargo 18 can successfully be restrained by the system 20, the cargo 18 will be described and depicted herein as a plurality of carts 18. One of ordinary skill in the art with a thorough review of this specification and figures will readily understand that the system 20 can be adapted for other types of cargo and would be able to implement the system 20 with other types of cargo (such as boxes or pallets), in addition to carts.

The system 20 comprises a plurality of beam assemblies 30 that are adapted to be adjustably mounted within the cargo compartment 10, such as between opposing sidewalk 12 and 14 of the cargo compartment 10, and to be movable vertically within the cargo compartment 10 as desired by a user. In one embodiment, the system 20 may be provided within the cargo compartment of a truck to provide a barrier to maintain the carts 18 (or other cargo) disposed between spaced-apart beam assemblies 30 during movement. As will be explained further below, the system 20 may further comprise a plurality of track sub-assemblies 80, 90, 100 and 110, which may be positioned in a pre-determined manner relative to preexisting vertical logistics posts 13 and 15 on the sidewalls 12 and 14 of the cargo compartment 10, respectively. As explained further below, the plurality of track sub-assemblies 80, 90, 100 and 110 advantageously permit a cargo compartment 10 to be retrofitted with newly-positioned track locations for the plurality of beam assemblies 30, which may allow for an optimal number of carts 18 or other cargo to be loaded into the cargo compartment 10.

Figures 3, 4:
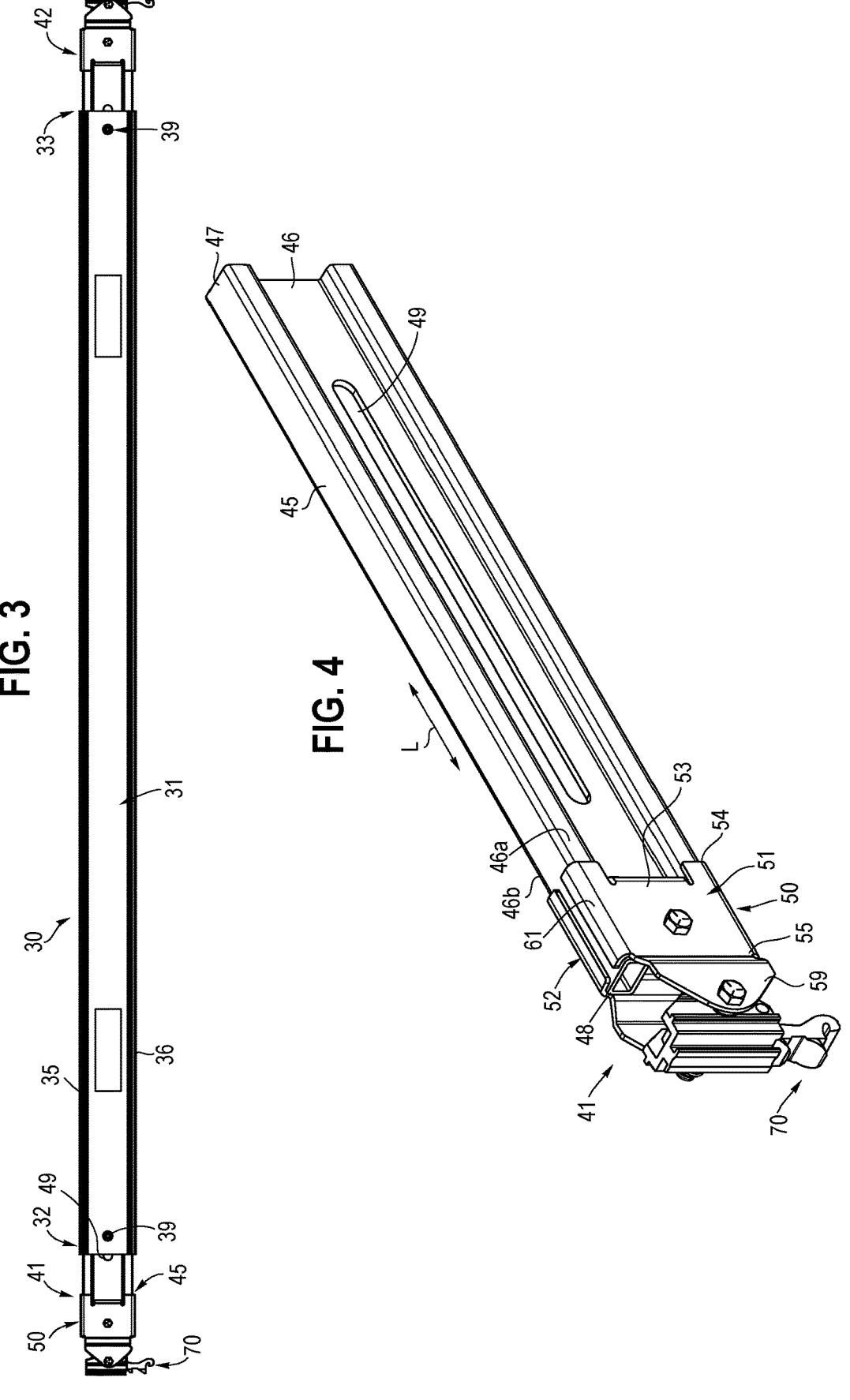
FIG. 3 is a side view of a beam assembly provided in accordance with the present embodiments.
FIG. 4 is a perspective view of a first end assembly of the beam assembly of FIG. 3 with an outer beam member removed.

Referring to FIGS. 3-7, a first embodiment of a beam assembly 30 of the system 20 is shown and described. The beam assembly 30 comprises a beam member 31 having first and second ends 32 and 33, and a hollow interior space 34. The beam assembly 30 further comprises first and second end assemblies 41 and 42. The first end assembly 41 extends laterally outward from the first end 32 of the beam member 31, while the second end assembly 42 extends laterally outward from the second end 33 of the beam member 31, as best seen in FIG. 3. In one example, the first end assembly 41 of the beam assembly 30 is substantially identical to the second end assembly 42, and therefore only the first end assembly 41 will be described in detail below.

Figure 5:
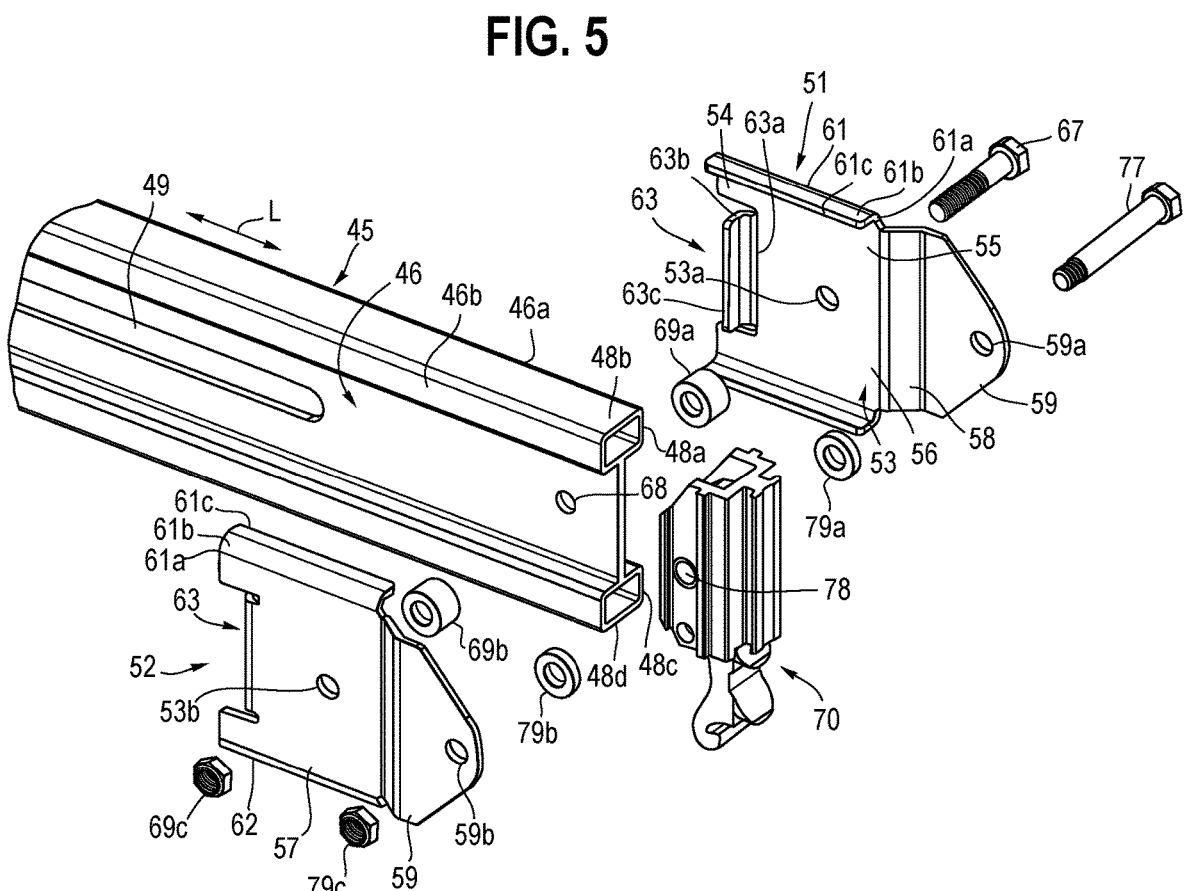
FIG. 5 is an exploded view the first end assembly of FIG. 4.

The first end assembly 41, which is shown in assembled and exploded views in FIGS. 4-5 outside of the beam member 31, comprises an inner segment 45, a bracket assembly 50, and a latch assembly 70. The inner segment 45 comprises a main body 46 that is dimensioned to be slidably received within the hollow interior space 34 of the beam member 31. The main body 46 has a first end 47 that overlaps with the beam member 31 and has a second end 48 that extends beyond the beam member 31. At least one slot 49 is disposed between the ends 47 and 48, as seen in FIG. 4. When in an assembled state, as depicted in FIG. 3, a coupling member 39, e.g., a screw or pin with a locking feature, may extend through the slot 49 to selectively stabilize the lateral position of the first end assembly 41 relative to the beam member 31.

The bracket assembly 50 of the first end assembly 41 may comprise a first bracket 51 and a second bracket 52, which are configured to be secured on opposing sides 46a and 46b of the main body 46 of the inner segment 45, as depicted in FIG. 4. In one embodiment, the first bracket 51 and the second bracket 52 are substantially identical or mirror-images of one another, and therefore only the first bracket 51 will be described in detail for the sake of brevity.

Figure 6:
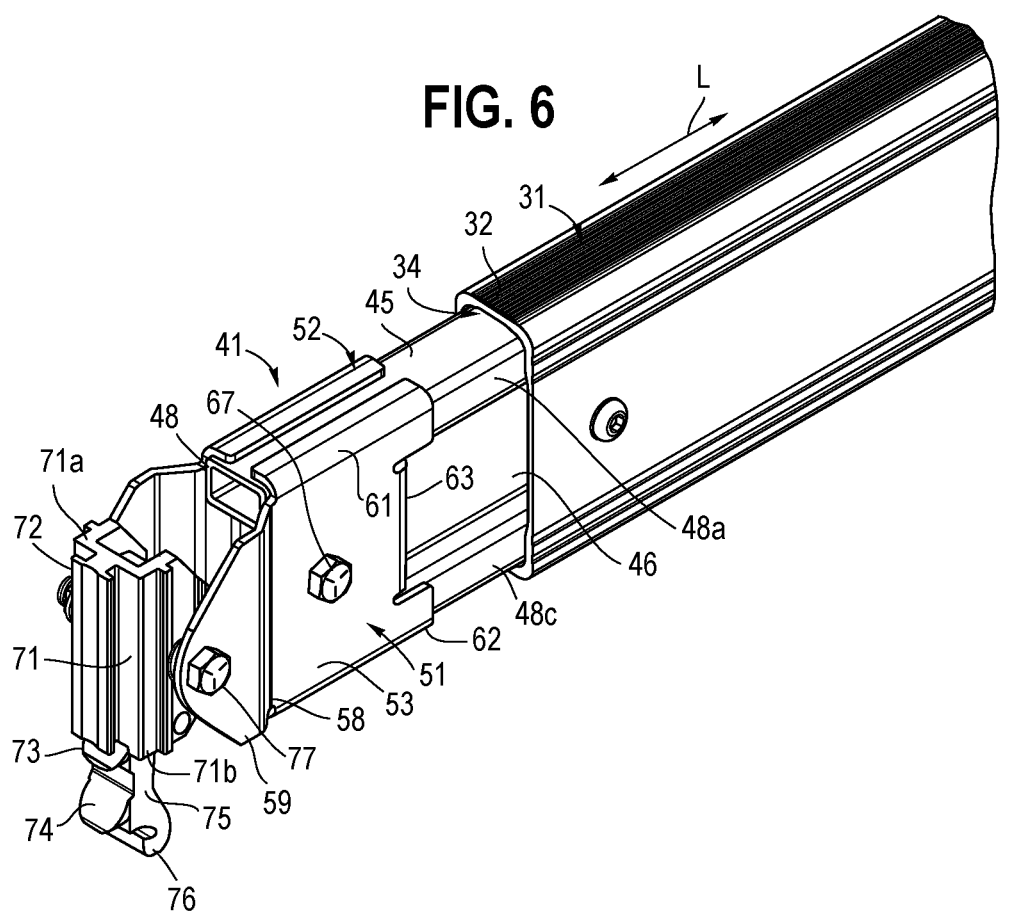
FIG. 6 is an enlarged perspective view of the beam assembly of FIG. 3.

The first bracket 51 comprises a main body 53 that extends in a substantially parallel direction to a longitudinal axis L of the main body 46 of the inner segment 45 when in an assembled state, as seen in FIGS. 3-4 and FIG. 6. The main body 53 comprises an axially inward region 54, an axially outward region 55, a radially inward region 56, and a radially outward region 57, as depicted in FIG. 5. The axially outward region 55 of the main body 53 extends to a latch-engaging segment 59 of the bracket 51 by a taper 58, as seen in FIG. 5. The taper 58 is oriented at an acute relative to the longitudinal axis L, such that the latch engaging segment 59 is generally parallel to the main body 53, but the latch engaging segment 59 is disposed radially outward with respect to the main body 53.

The radially outward position of the latch-engaging segment 59 facilitates coupling to the latch assembly 70, as the latch assembly 70 may be coupled between the latch-engaging segment 59 of the first bracket 51 and the opposing latch-engaging segment 59 of the second bracket 52, as shown in the assembled states of FIG. 4 and FIG. 6. In one embodiment, a bolt 77 may extend through an aperture 59a in the latch-engaging segment 59 of the first bracket 51, then may extend through an aperture 78 in the latch assembly 70, and further may extend through an aperture 59b in the latch-engaging segment 59 of the second bracket 52, as depicted in FIG. 5. A plurality of washers 79a and 79b may be disposed on each side of the aperture 78, and a cap or nut 79c may secure the bolt 77 in position. In this manner, the bracket assembly 50 may be operably coupled to the latch assembly 70.

Referring still to FIG. 5, in this exemplary embodiment, a bolt 67 may extend through an aperture 53a in the main body 53 of the first bracket 51, then may extend through an aperture 68 in the inner segment 45, and further may extend through an aperture 53b in the main body 53 of the second bracket 52, as depicted in FIG. 5. A plurality of spacers 69a and 69b may be disposed on each side of the aperture 68, and a cap or nut 69c may secure the bolt 67 in position. In this manner, the bracket assembly 50 may be operably coupled to the inner segment 45.

The spacers 69a and 69b may be particularly useful when the inner segment 45 has upper and lower extruded portions, which are separately by a non-extruded central region, as shown in FIG. 5. In this manner, the spacers 69a and 69b may be generally sandwiched between the first and second brackets 51 and 52 and the extruded portion of the inner segment 45. The spacers 69a and 69b may comprise a length slightly shorter than the space between parts where they are initially placed. As the bolt 67 and the nut 69c are tightened, there is a clamping force created on the first and second brackets 51 and 52 against the top and bottom elements of the extruded portions of the inner segment 45. As the bolt 67 and the nut 69c are tightened further, the first and second brackets 51 and 52 may bend inward slightly until the spacers 69a and 69b are contacted, and then the bolts are fully tightened to clamp the first and second brackets 51 and 52, the spacers 69a and 69b, and the extruded portion of the inner segment 45 together as a unit.

The first bracket 51 further comprises a first curved segment 61 and a second curved segment 62, where the first curved segment 61 and the second curved segment 62 are spaced apart from one another by the main body 53 in a vertical direction, as shown in FIGS. 5-6. The first curved segment 61 extends from a first region 61a at an upper part of the main body 53, through a curved or angled region 61b that causes an extension in a radially inward direction towards the second bracket 52, and further has a third region 61c that is generally at about a 90 degree angle relative to the first region 61a; however, it will be appreciated that the first and third regions 61a and 61c may be disposed at angles greater or less than 90 degrees. Similarly, the second curved segment 62 extends from a lower part of the main body 53, and through a curved or angled region in a radially inward direction towards the first bracket 51, as depicted in FIGS. 5-6.

When assembled, the first curved segment 61 is disposed in an abutting manner against a first vertical surface 48a near the second end 48 of the inner segment 45, and further is disposed in an abutting manner against a first horizontal surface 48b near the second end 48 of the inner segment 45, which in this example overlaps two sides of a generally rectangular extruded upper portion of the inner segment 45. Similarly, when assembled, the second curved segment 62 is disposed in an abutting manner against a second vertical surface 48c near the second end 48 of the inner segment 45, and further is disposed in an abutting manner against a second horizontal surface 48d near the second end 48 of the inner segment 45, thus effectively overlapping two sides of a generally rectangular extruded lower portion of the inner segment 45, as depicted in FIGS. 4-6.

It should be noted that the second bracket 52 comprises similar first and second curved segments 61 and 62, and therefore the four different curved segments (i.e., two curved segments 61 and 62 being provided on each bracket 51 and 52) allow the bracket assembly 50 to substantially encircle the inner segment 45 in an abutting or mating relationship, as best seen in the assembled states of FIGS. 4 and 6.

Advantageously, the abutting or mating relationship provided by the first and second curved segments 61 and 62 on the first bracket 51, and the opposing first and second curved segments 61 and 62 on the second bracket 52, provides an extremely low profile for the bracket assembly 50. Moreover, the abutting or mating relationship reduces the location for pinch points of the first end assembly 41 during handling.

As a further advantage, by forming the edges of the brackets towards the inside, it has been determined that added strength and stiffness is applied to the brackets to better withstand shoring loads applied to the beam assembly 30.

The first bracket 51 further comprises an inward curved segment 63 that is positioned near the axially inward region 54, and vertically between the first and second curved segments 61 and 62, as shown in FIGS. 5-6. The inward curved segment 63 extends from a first region 63a adjacent to the main body 53, through a curved or angled region 63b that causes an extension in a radially inward direction towards the inner segment 45 and the second bracket 52, and further has a third region 63c that is generally at about a 90 degree angle relative to the first region 63a; however, it will be appreciated that the first and third regions 63a and 63c may be disposed at angles greater or less than 90 degrees.

When assembled, the inward curved segment 63 is disposed in a space vertically between the first and second vertical surfaces 48a and 48c of the extruded portions of the inner segment 45, as best seen in FIG. 6. The inward extension of the third region 63c allows it to be disposed in close proximity to the central non-extruded portion of the inner segment 45. Advantageously, the close proximity of the inward curved segment 63 relative to the non-extruded portion of the inner segment 45 reduces the likelihood of pinch points during handling as will be apparent from FIG. 4 and FIG. 6. It should be noted that the second bracket 52 comprises a similar inward curved segment 63, which provides the same advantages on an opposing side of the inner segment 45.

The latch assembly 70 of the first end assembly 41 may comprise a main body 71 that comprises a generally vertical orientation between first and second regions 71a and 71b, as best seen in FIG. 6. The main body 71 may comprise a guiding segment 72 configured to engage a track coupled to a track sub-assembly 80, 90, 100 or 110 positioned in the cargo compartment 10, as will be explained further below. In one embodiment, the latch assembly 70 may comprise one or more latching fingers 73 and 74, which are disposed on a rotatable portion 75. In one example, as described in U.S. Pat. No. 8,172,494, which is hereby incorporated by reference in its entirety, the latching fingers 73 and 74 may be spring-biased towards the sidewalls 12 and 14 of the cargo compartment 10, but may be disengaged from apertures in the track sub-assemblies 80, 90, 100 and 110 upon application of a sufficient force applied to an end feature 76 of the rotatable portion 75. This is merely one, non-limiting example of how the beam assembly 30 of the present embodiments may be latched into engagement with the track sub-assemblies 80, 90, 100 and 110 of the cargo compartment 10 described further below.

Figure 7:
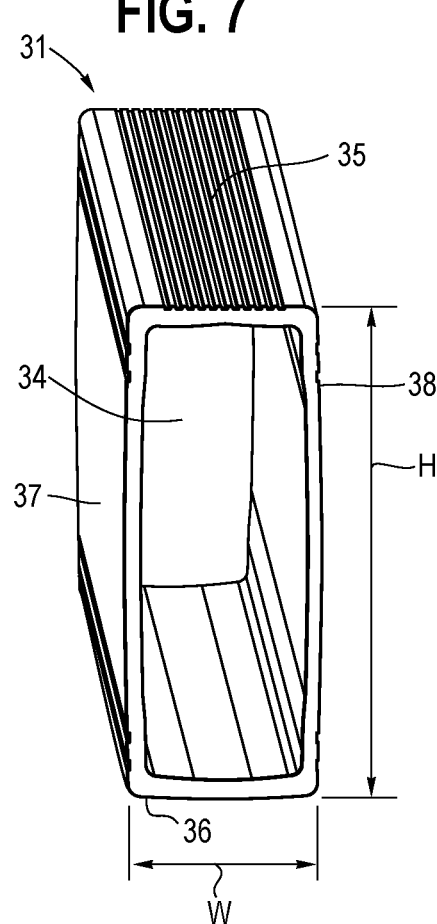
FIGS. 7-8 are, respectively, perspective views of a beam member in accordance with the present embodiments having a first width and a first height, and a prior beam member having a different width and height.
Figure 8:
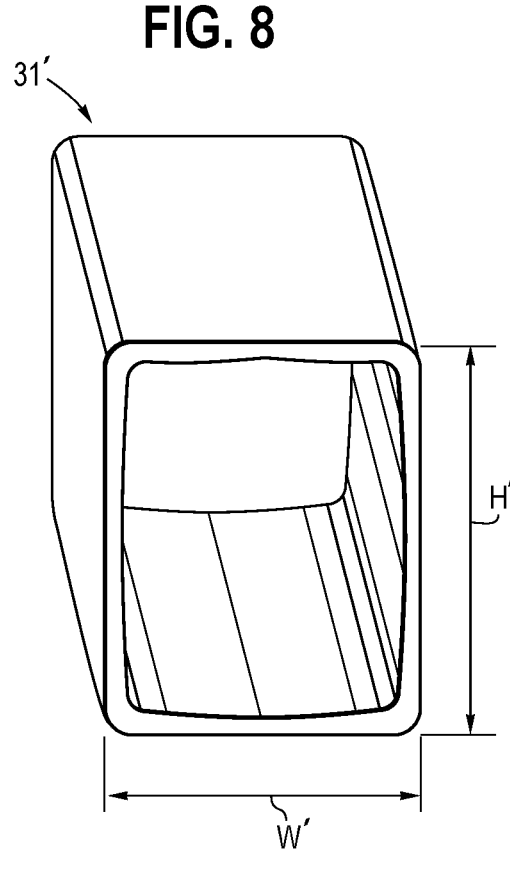

Referring now to FIGS. 7-8, a segment of the beam member 31 is shown in an isolated manner in FIG. 7, in comparison to a prior alternative beam member 31' in FIG. 8. The beam member 31 comprises an upper surface 35, a lower surface 36, and side surfaces 37 and 38, which bound the hollow interior space 34. The beam member 31 comprises an increased height H and a reduced width W, relative to a height H' and a width W' of the alternative beam member 31', as depicted in FIGS. 7-8.

In one example, the height H may be in a range between about 33 inches to about 5.0 inches, and the width W may be in a range between about 0.8 inches to about 2.4 inches. A ratio of the height H to the width W may be in a range of about 1.3 to about 4.0. In contrast, the alternative beam member 31' has a height H' less than that height range, a width 31' greater than that width range, and a ratio lower than those ratio ranges.

Through extensive testing exercises, the inventors have discovered that by providing the dimensions noted above for the beam member 31, the beam member 31 may withstand cargo forces imposed upon it similar to the alternative beam member 31', when the cargo is loaded in the cargo compartment 10 in the manner of FIGS. 1-2 and described further below.

Advantageously, by providing a relatively narrow beam assembly 30, and in particular due to the dimensions of the beam member 31, a comparable amount of cargo force may be restrained while simultaneously reducing the width W of each beam assembly 30, which provides additional space in the forward and rearward directions of the cargo compartment 10. When a plurality of beam assemblies 30 are used, as explained further below, the additional space achieved by the reduced width W is further increased, which results in the ability to store additional cargo (such as carts 18) in the forward and rearward direction of the cargo compartment 10.

Referring now to FIGS. 9-12, the system 20 for restraining the cargo 18 within the cargo compartment 10 may further comprise a plurality of track sub-assemblies 80, 90, 100 and 110, which may be positioned in a pre-determined manner relative to existing vertical logistics posts 13 and 15 on the sidewalk 12 and 14 of the cargo compartment 10, respectively. As explained further below, the plurality of track sub-assemblies 80, 90, 100 and 110 advantageously permit a cargo compartment 10 to be retrofitted with newly-positioned track locations for the plurality of beam assemblies 30, which may allow for an optimal number of carts 18 to be loaded into the cargo compartment 10.

Figure 9:
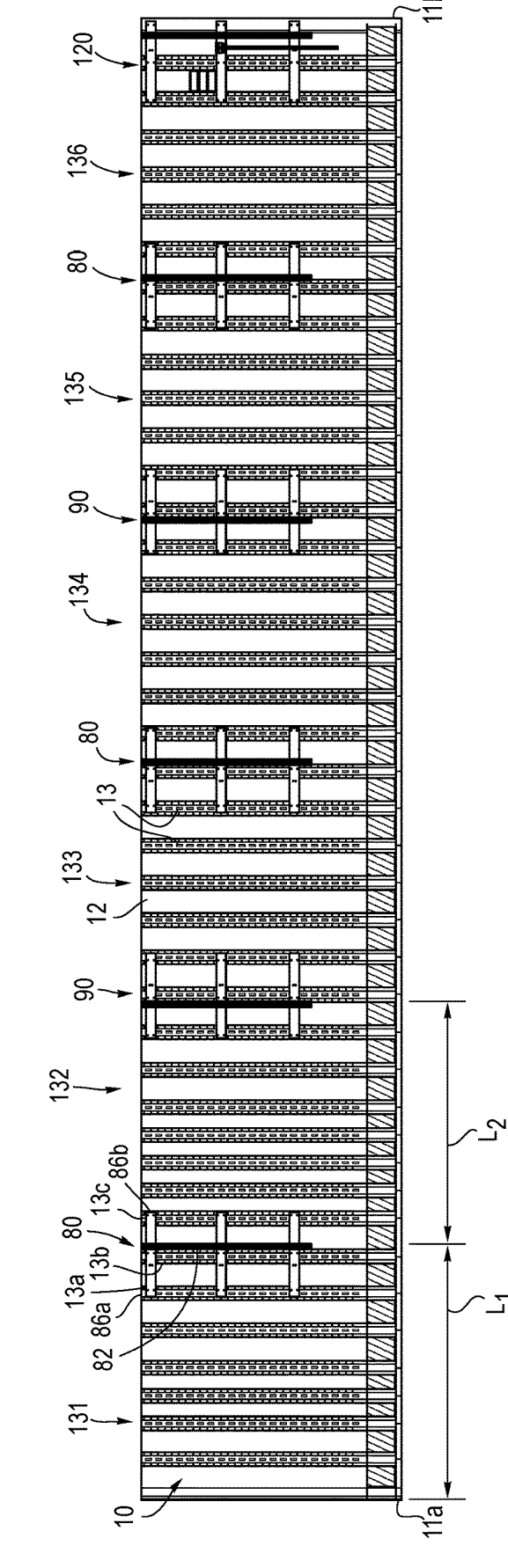
FIG. 9 is a schematic side view along a full sidewall of the cargo compartment of FIG. 1, depicting placement of selected track sub-assemblies in accordance with the present embodiments.
Figure 10:
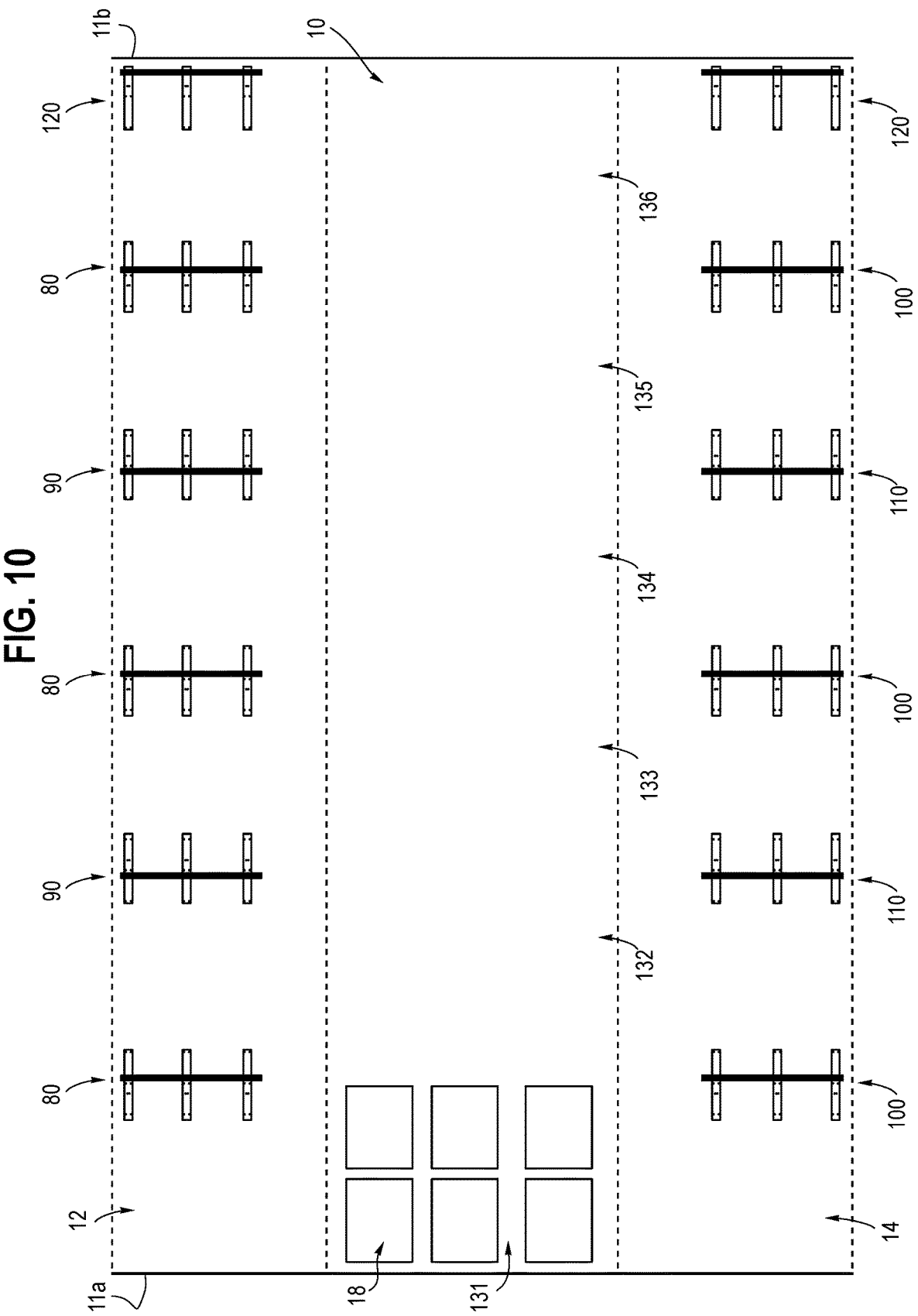
FIG. 10 is a schematic top view depicting an exemplary layout of various track sub-assemblies in a cargo compartment, with sidewalls depicted as being laid flat for illustrative purposes instead of being raised 90 degrees upward.

FIGS. 9-10 collectively depict one example of an arrangement of a plurality of track sub-assemblies 80, 90, 100 and 110 relative to one another within the cargo compartment 10, in a manner that may optimize placement of tracks and consequently cargo loading. In FIGS. 9, it should be noted that the sidewall 12 of the cargo compartment 10 of FIGS. 1-2 is shown from a side view along a full length extending between a forward end 11a and a rearward end 11b, with the plurality of preexisting vertical logistics posts 13 being shown. In FIG. 10, both of the sidewalk 12 and 14 are shown, however, they are depicted as being laid flat (instead of raised 90 degrees upward) and without the plurality of preexisting vertical logistics posts 13 and 15 being shown, for illustrative purposes to show the position of all of the track sub-assemblies 80, 90, 100 and 110 on both sidewalk 12 and 14.

Figures 11A, 11B:
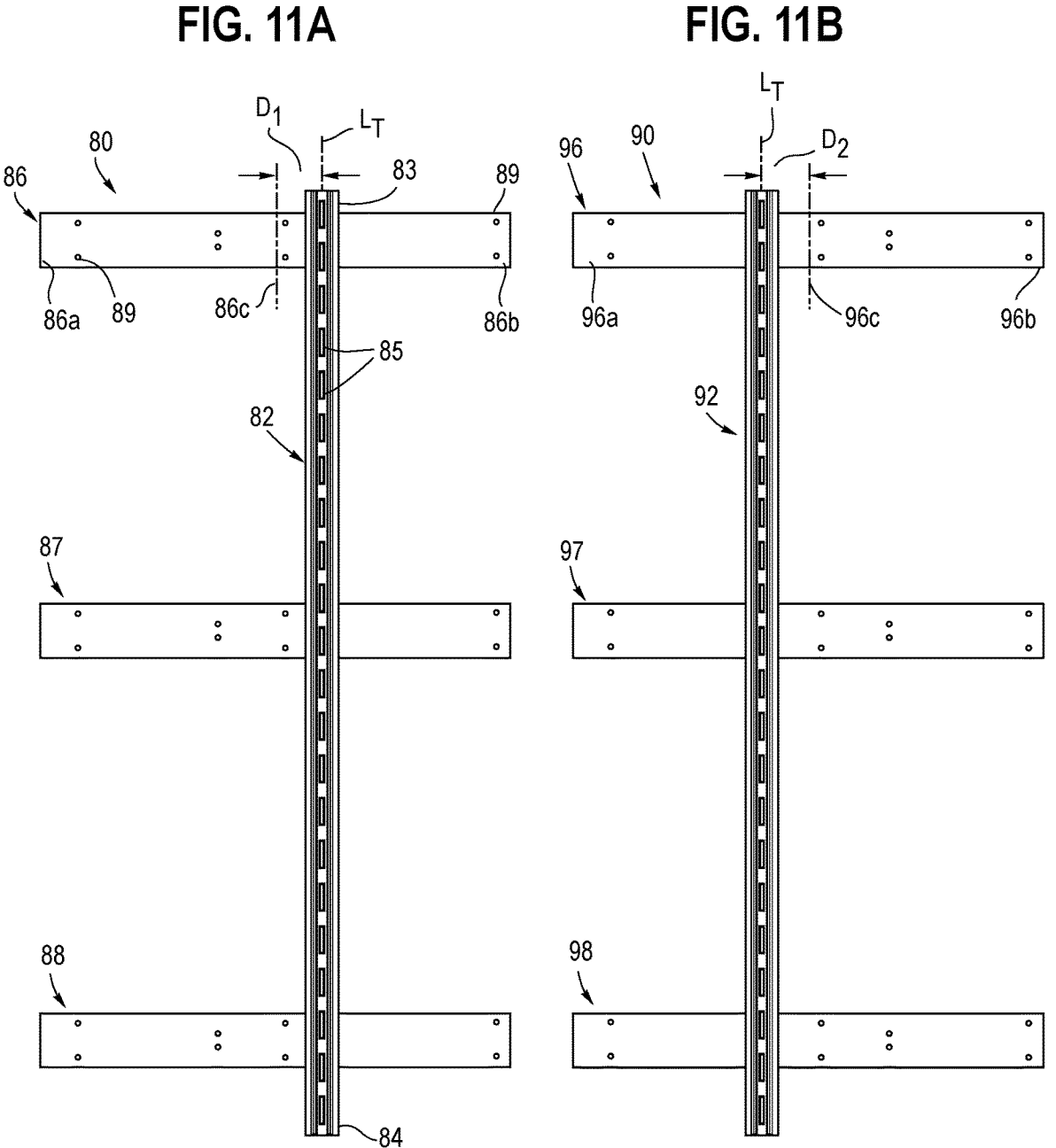

Each of the track sub-assemblies 80, 90, 100 and 110 generally comprises a vertical track and at least one horizontal support member, for example and without limitation, three horizontal support members, as shown in FIGS. 11A-11D. Referring to FIG. 11A, the track sub-assembly 80 comprises a vertical track 82 having upper and lower ends 83 and 84, and further comprises three horizontal support members 86, 87 and 88, which intersect with the vertical track 82 as explained further below. The vertical track 82 may comprise a plurality of vertically spaced-apart slots 85, which are intended to engage the latching fingers 73 and 74 of the latch assembly 70 of the beam assembly 30, thereby allowing for vertical adjustments of the beam assembly 30 within the cargo compartment 10 during operation.

It should be noted that the first horizontal support member 86 in FIG. 11A is similar to the second and third horizontal support members 87 and 88 of the track sub-assembly 80, albeit spaced-apart vertically to provide support to the vertical track 82 along its height. Therefore, for the sake of brevity, only the first horizontal support member 86 will be described in detail.

The first horizontal support member 86 includes a first end 86a that is dimensioned to be secured to a first preexisting vertical logistics post 13a in the sidewall 12, and further includes a second end 86b that is dimensioned to be secured to a third preexisting vertical logistics post 13c in the sidewall 12, as shown in FIG. 9. A central region of the first horizontal support member 86 is secured to a second preexisting vertical logistics post 13b, as depicted in FIG. 9. In one example, a plurality of apertures 89 are provided to identify drilling or attachment locations for securing the first horizontal support member 86 relative to each of the preexisting vertical logistics posts 13a-13c. In this manner, installation may be simplified for a user. However, it will be appreciated that the horizontal support members may be secured to the existing vertical logistics posts by other mechanisms than drilling, such as using hooks on the horizontal support members that engage slots in the preexisting logistics posts.

As shown in FIG. 11A, the first horizontal support member 86 includes a center point 86c, measured as halfway between the first and second ends 86a and 86b. Notably, a central longitudinal axis $L_T$ of the vertical track 82 is offset from the center point 86c of the first horizontal support member 86 by a distance $D_1$, as depicted in FIG. 11A. In this example, the vertical track 82 is offset towards the second end 86b, which results in the vertical track 82 being positioned a desired length $L_1$ from the forward end 11a of the cargo compartment, as measured in FIG. 9. At the desired length $L_1$, the vertical track 82 is disposed on a rearward side of the second preexisting vertical logistics post 13b, as shown in FIG. 9.

As shown in FIGS. 9-10, the plurality of track sub-assemblies 80 and 90 are positioned in an alternating sequence along the sidewall 12 of the cargo compartment 10. The first track sub-assembly 80 (closest to the forward end 11a and labeled in FIG. 9) may be spaced apart a second length $L_2$ from the nearest track sub-assembly 90. In one embodiment, the lengths $L_1$ and $L_2$ are substantially identical, e.g., within less than 2% of one another.

The track sub-assembly 90 is similar to the track sub-assembly 80 explained in detail above, with a few notable exceptions. In particular, the first horizontal support member 96 of the track sub-assembly 90 includes a center point 96c, measured as halfway between first and second ends 96a and 96b. The central longitudinal axis $L_T$ of the vertical track 92 is offset from the center point 96c of the first horizontal support member 96 by a distance $D_2$, as depicted in FIG. 11B. In this example, the vertical track 92 is offset towards the first end 96a, which results in the vertical track 92 being positioned the desired length $L_2$ from the vertical track 82 of the track sub-assembly 80, as depicted in FIG. 9. Therefore, in this example, it was necessary to place the vertical track 92 at a different orientation along the horizontal support members 96-98 compared to the placement of the vertical track 82 relative to its respective horizontal support members 86-88, factoring into consideration placements of preexisting vertical logistics posts in known styles of cargo compartments.

Figure 12:
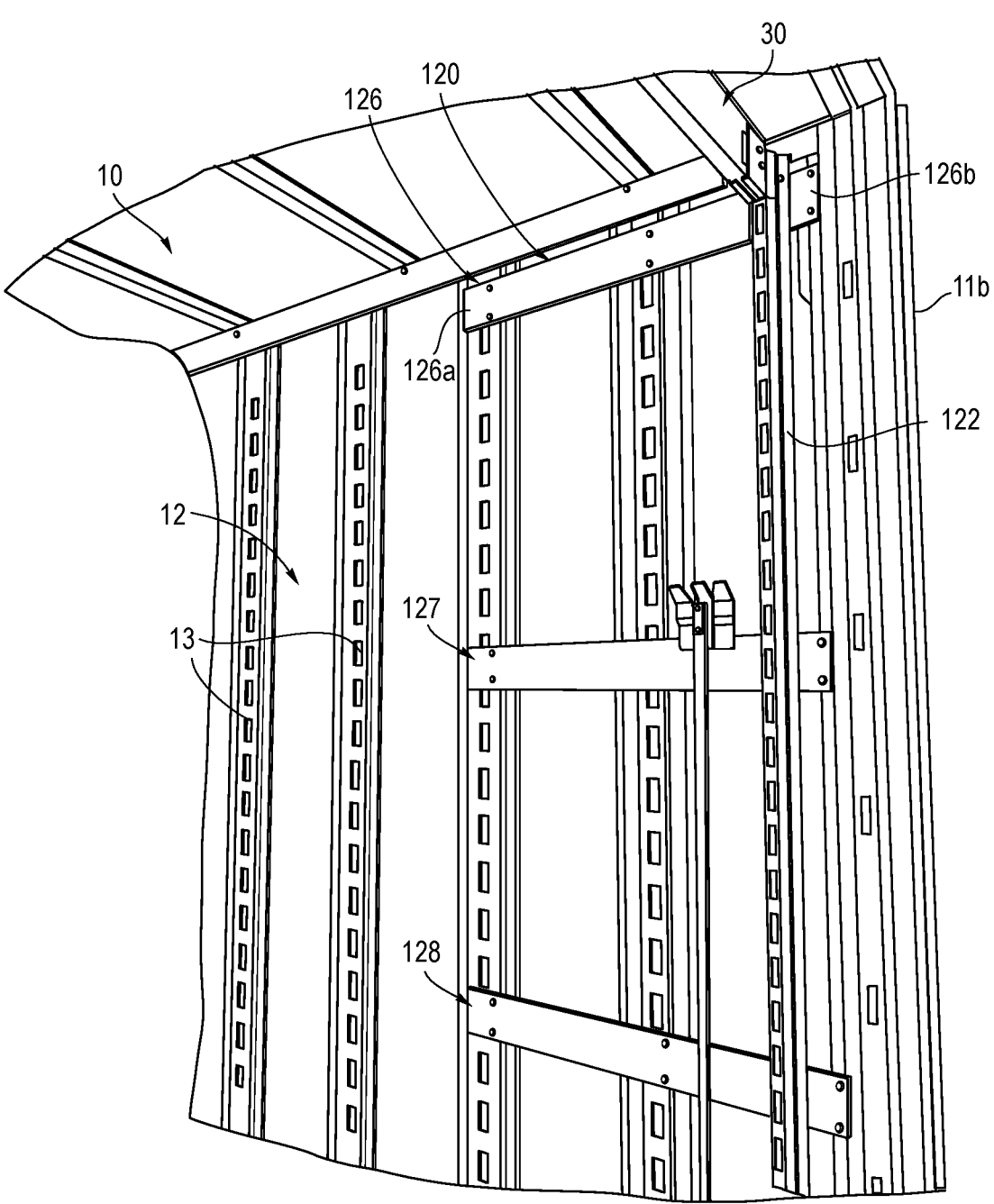
FIG. 12 is a perspective view of a rear track sub-assembly in a cargo compartment in accordance with the present embodiments.

As shown in FIGS. 9-10, the placement of track sub-assembly 80 may continue to alternative with the placement of track sub-assembly 90, in this example until three track sub-assemblies 80 have been installed, and until two track sub-assemblies 90 have been installed. Notably, a rear track sub-assembly 120 (explained further below) may be positioned near the rearward end 11b of the sidewall 12, as shown in FIGS. 9-10 and FIG. 12. In this manner, six distinct cargo zones 131-136 are provided along the sidewall 12 of the cargo compartment 10, as depicted in FIG. 9 and explained further below.

Referring briefly to FIG. 11C, in conjunction with FIG. 10, the track sub-assembly 100 comprises a vertical track 102 and three horizontal support members 106-108, in a manner similar to the track sub-assemblies 80 and 90. However, the track sub-assembly 100 is configured as a mirror-image to the track sub-assembly 80 in particular. As a mirror-image, the vertical track 102 aligns precisely at the same length $L_1$ from the forward end 11a of the cargo compartment 10, and therefore aligns across from the vertical track 82, such that a beam assembly 30 may extend horizontally across the cargo compartment 10 between the vertical tracks 82 and 102 of the respective sub-assemblies 80 and 100.

Referring briefly to FIG. 11D, in conjunction with FIG. 10, the track sub-assembly 110 comprises a vertical track 112 and three horizontal support members 116-118, which is configured as a mirror-image to the track sub-assembly 90 in particular. As a mirror-image, the vertical track 112 aligns precisely at the same length $L_2$ from the sub-assembly 100, and therefore aligns across from the vertical track 92, such that another beam assembly 30 may extend horizontally across the cargo compartment 10 between the vertical tracks 92 and 112 of the respective sub-assemblies 90 and 110.

As depicted in FIG. 10, three of the track sub-assemblies 100 alternate with two of the track sub-assemblies 110, such that each track sub-assembly 100 directly opposes a track sub-assembly 80, and each track sub-assembly 110 directly opposes a track sub-assembly 90, along a predetermined length of the cargo compartment 10.

As noted above, the rear track sub-assembly 120 may be positioned near the rearward end 11b of the sidewall 12, as shown in FIGS. 9-10 and FIG. 12. The track sub-assembly 120 comprises a vertical track 122 and three horizontal support members 126-128, as shown in FIG. 12. The horizontal support member 126 has forward and rearward ends 126a and 126b, and in this embodiment, the vertical track 122 may be secured significantly closer to the rearward end 126b to maximize the storage ability when the beam assembly 30 is loaded in the vertical track 122. Similar to prior embodiments, a mirror image rear track sub-assembly 120' may be positioned on the sidewall 14 directly across from the track sub-assembly 120, as shown in FIG. 10.

As noted above, in this manner, six distinct cargo zones 131-136 are provided in the cargo compartment 10, since there are twelve total track sub-assemblies, where six of the track sub-assemblies oppose each other within the cargo compartment 10. Six corresponding beam assemblies 30 can be positioned horizontally across the cargo compartment 10, aligning with the vertical tracks of the six opposing track sub-assemblies.

In one embodiment, where the cargo compartment 10 is a 53' foot trailer (i.e., 636" in the forward to rearward directions), and there are six zones 131-136, then the lengths $L_1$ and $L_2$ of FIG. 9 may be between about 100 and about 105 inches long, taking into account a small amount of space is taken up by the six beam assemblies 30 extending across the cargo compartment. In the example where six zones 131-136 are each between about 100 and about 105 inches long, and two rows of carts 18 are provided in each zone, as depicted in FIG. 10, then the length of each cart 18 (as measured in a forward to rearward direction) may be between about 48 to about 52 inches long. In one example, where each zone 131-136 has two rows of three carts across (as depicted in the formation of FIG. 10), then the cart dimensions may be about 48 to about 52 inches long, about 28 to about 32 inches wide, and the height may be between about 30 to about 90 inches high.

It should be noted in FIGS. 9-10 that the track sub-assemblies 80, 90, 100, 110 and 120 may be positioned closer to the ceiling of the sidewalk 12 and 14, as compared to the floor. In an exemplary installation step, after the track sub-assemblies 80, 90, 100, 110 and 120 are secured to the sidewalk 12 and 14 in the manner shown, the end regions 41 and 42 of the beam assemblies 30 may be inserted into the tracks of the respective track sub-assemblies 80, 90, 100, 110 and 120, in a manner where the end regions 41 and 42 are loaded into the lower ends of the tracks, e.g., at lower end 84 of track 82 of FIG. 11A. In a subsequent step, the beam assemblies may be moved upward within the tracks towards the upper end, e.g., upper end 83 of track 82. This upper position may be a storage position, located near the ceiling of the cargo compartment, which may be a default position when a particular beam assembly 30 is not being used. In one embodiment, after the beam assembly 30 has been coupled to a given track, a beam stop may be installed at the lower end of each track in order to hold the beam assembly 30 in place between the lower and upper ends of a respective track.

Advantageously, the system 20 of the present embodiments provides an integrated series of track sub-assemblies 80, 90, 100, 110 and 120, and respective beam assemblies 30 that may be stored near the ceiling of the cargo compartment 10 when not in use. The system 20 avoids the requirement for bringing in stand-alone beams from outside of the cargo compartment, and therefore stand-alone beams are not required to be stored at a loading dock. This saves considerable time and also reduces the likelihood of injuries.

As a further advantage, the system 20 generally avoids the need to use cargo securement straps to secure cargo. In the example where the cargo 18 comprises a plurality of carts, a significant number of straps would be required to adequately restrain the carts individually, and the straps would take a relatively long time to install (and subsequently roll up to a storage state), as compared to the integral beam assemblies 30 of the present embodiments.

As yet another advantage, the beam assemblies 30 of the present system 20 comprise a significantly reduced width, as compared to prior known beam assemblies, which may increase the space available for the cargo 18 (particularly when the cargo is a plurality of carts as explained above), and more beam assemblies 30 may be provided in the forward to rearward directions of the cargo compartment 10 since they take up less space. When the cargo 18 comprises carts in particular, the relatively slim design of the beam assemblies 30 may allow for at least six zones in the cargo compartment 10, where each zone can safely restrain two rows of three carts across, for a total of 36 total carts being restrained by six beam assemblies, as explained with respect to FIG. 10 above.

As yet a further advantage, explained above, the plurality of track sub-assemblies 80, 90, 100 and 110 advantageously permit a cargo compartment 10 to be retrofitted with newly-positioned track locations for the plurality of beam assemblies 30, which may allow for an optimal number of carts 18 to be loaded into the cargo compartment 10.

It will be appreciated that although six beam assemblies 30 have been described, the system 20 may include greater or fewer beam assemblies (and related track-subassemblies), without departing from the present embodiments.

It will also be appreciated that an alternative beam assembly comprising the beam member 31' of FIG. 8 may be used with the track sub-assemblies 80, 90, 100 and 110 described above. In such an embodiment, the alternative beam assembly may comprise a greater width overall (due to the greater width of the beam member 31'), in which case fewer than six of the alternative beam assemblies may be provided within the cargo compartment 10 (and thus fewer than six zones 131-136 may be formed), but such an embodiment is contemplated within the scope of the present embodiments.

Figure 13:
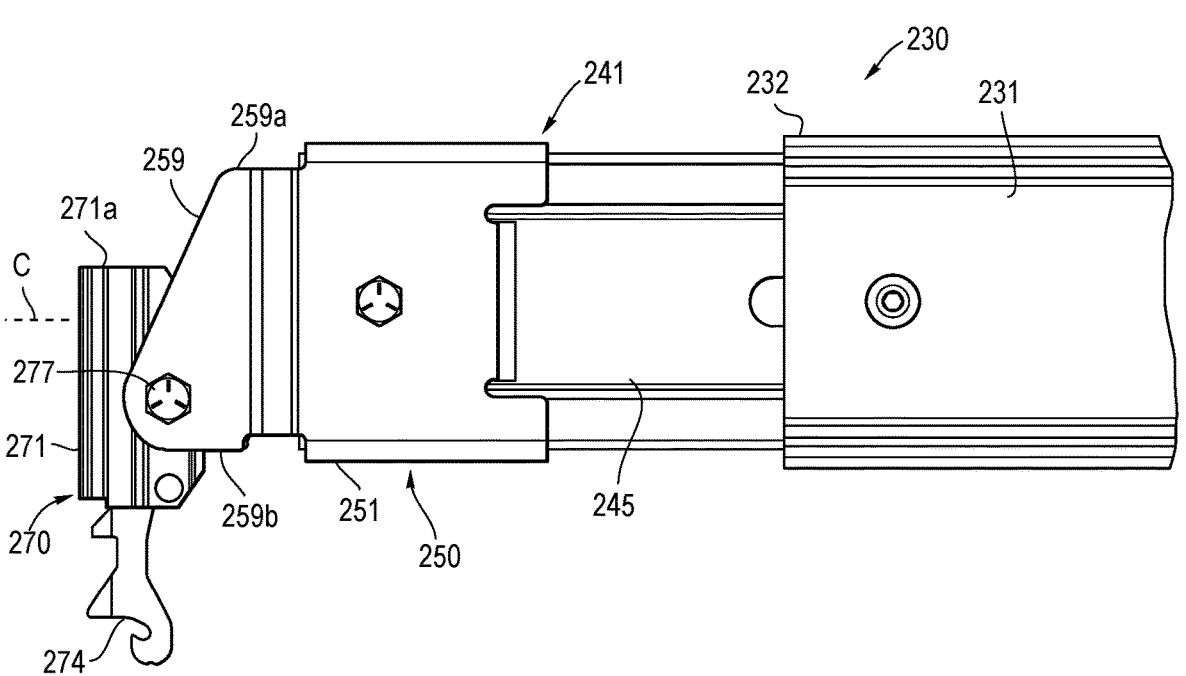
FIG. 13 is a side view of an alternative embodiment of a beam assembly.

Referring to FIG. 13, an alternative embodiment of a beam assembly is shown and described. The alternative beam assembly 230 is similar to the beam assembly 30 of 1-12, with notable exceptions referenced below. For brevity, only a first end (left side) of the beam assembly 230 is shown in FIG. 13, but it will be appreciated that the second end (right side) may have equivalent opposing features.

The beam assembly 230 comprises a beam member 231 having a first end 232, with a first end assembly 241 extending laterally outward from the first end 232 of the beam member 231. The first end assembly 241 comprises an inner segment 245, a bracket assembly 250, and a latch assembly 270, which are similar to elements 45, 50 and 70, respectively, as described above.

In the embodiment of FIG. 13, a portion of the latch assembly 270 extends lower relative to a centerline C of the beam member 231, as compared to the latch assembly 70 of FIG. 3. In FIG. 13, a latch-engaging segment 259 of a first bracket 251 may comprise a variable shape compared to the latch-engaging segment 59 of the first bracket 51 of the beam assembly 30 of FIG. 3. In particular, the latch-engaging segment 259 may comprise a lower region 259b that extends further laterally outward relative to an upper region 259a, as depicted in FIG. 13. The lateral outward extension of the lower region 259b allows a bolt 277 to be secured to the main body 271 of the latch assembly 270 at a lower location relative to the centerline C of the beam member 231. Consequently, the pivot point of the latch assembly 270 may be vertically lower than the pivot point of the latch assembly 70. Further, the upper surface 271a of the latch assembly 270, and the latching finger 274, may be positioned vertically lower than the upper region 71a and latching to finger 74, respectively, of the latch assembly 70.

The embodiment of FIG. 13 may be advantageous if a user desires additional head room under the beam member 231, when the beam member 231 is in a stored position near the top of the vertical logistics post 13 or 15 (seen in FIG. 1). In particular, by moving the pivot point of the latch assembly 270 downward, the upper surface 271a can still rotate even when the beam member 231 is in an uppermost storage position, i.e., very close to the ceiling of the cargo compartment 10. It is estimated that, by moving the latch assembly 270 lower relative to the centerline C of the beam member 231, the beam member 231 may effectively be raised by about 1 inch to about 2 inches when it is in its stored position, as compared to the latch assembly 70.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described,

We claim:

1. A beam assembly for restraining cargo in a cargo compartment, the beam assembly comprising:
   a beam member having first and second ends, and a hollow interior space; and
   a first end assembly extending laterally outward from the first end of the beam member,
   wherein the first end assembly comprises an inner segment, a bracket assembly, and a latch assembly for engaging a track in a cargo compartment,
   wherein the inner segment comprises a main body dimensioned to be slidably received within the hollow interior space of the beam member,
   wherein the main body of the inner segment comprises a first side, a second side that opposes the first side, and a horizontal surface between the first side and the second side,

wherein the bracket assembly comprises a first bracket having a main body that extends in a substantially parallel direction to the main body of the inner segment, and
   wherein the first bracket further comprises at least one curved segment including a first curved segment that extends along the first side and curvedly or angularly transitions to also extend at least partially across the horizontal surface.

2. The beam assembly of claim 1, wherein the bracket assembly of the first end assembly further comprises a second bracket having a main body that extends in a substantially parallel direction to the main body of the inner segment, and wherein the second bracket further comprises at least one curved segment that extends along the second side and curvedly or angularly transitions to also extend at least partially across the horizontal surface.

3. The beam assembly of claim 1, wherein the horizontal surface is a first horizontal surface and the main body of the inner segment further comprises a second horizontal surface vertically spaced apart from the first horizontal surface; and wherein the first bracket comprises a second curved segment that is vertically spaced apart from the first curved segment and that extends along the first side and curvedly or angularly transitions to also extend at least partially across the second horizontal surface.

4. The beam assembly of claim 3, wherein inner segment comprises a I-beam profile with a vertically elongated and narrower middle portion positioned between wider top and bottom portions, and wherein the first bracket further comprises a third curved segment that is positioned between the first curved segment and the second curved segment and that extends towards the narrower middle portion.

5. The beam assembly of claim 1, wherein a
   ratio of a height of the beam member to a width of the beam member is in a range between about 1.3 to about 4.0.

6. The beam assembly of claim 5, where the width of the beam member is in a range between about 0.8 inches to about 2.4 inches.

7. The beam assembly of claim 5, where the height of the beam member is in a range between about 3.3 inches to about 5.0 inches.

8. The beam assembly of claim 1, wherein
   the beam member comprises a centerline extending from the first end to the second;
   wherein the bracket assembly attaches via a fastener to the latch assembly; and
   wherein the fastener is positioned below the centerline.

9. The beam assembly of claim 8 wherein:
   the bracket assembly comprises a latch-engaging section with a lower portion below the centerline and an upper portion above the centerline; and
   the lower portion extends further laterally outward relative to the upper portion.

10. The beam assembly of claim 9, wherein:
    the lower portion comprises a lower edge, and
    the latch-engaging section comprises an angled edge that extends between the upper portion and the lower edge, the angled edge extending outward and away from the inner segment as it extends from the upper portion to the lower edge.

11. The beam assembly of claim 8, wherein:
    the inner segment attaches to the bracket assembly via a second fastener; and
    the fastener is offset lower than the second fastener.

12. The beam assembly of claim 11, wherein the second fastener is aligned with the centerline or is above the centerline.

\* \* \* \* \*